Sept. 2, 1952    E. W. BABCOCK    2,608,799
BENDING MOLD LOCATING DEVICE
Original Filed Sept. 22, 1949
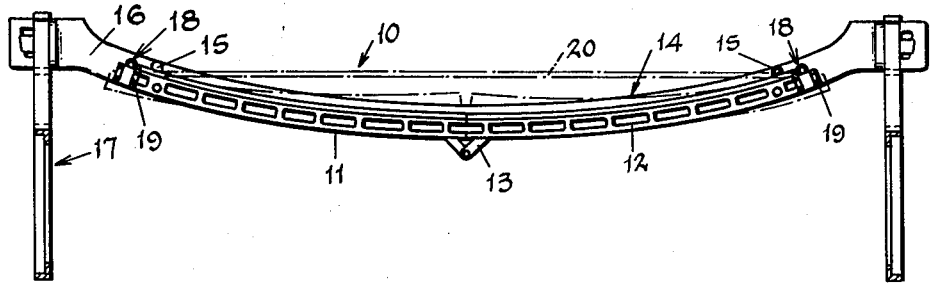
Fig. 1
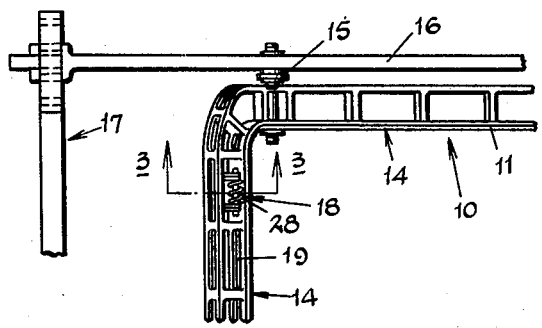
Fig. 2
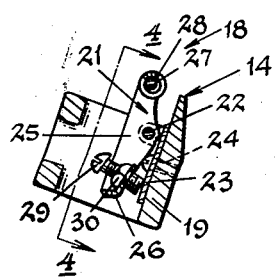  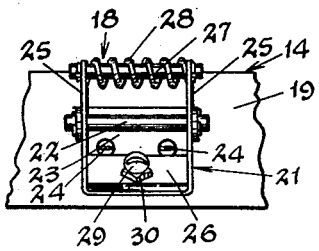
Fig. 3    Fig. 4
Inventor
Eugene W. Babcock
By Nobbe & Swope
Attorneys Patented Sept. 2, 1952

2,608,799

UNITED STATES PATENT OFFICE 2,608,799

BENDING MOLD LOCATING DEVICE

Eugene W. Babcock, Perrysburg, Ohio, assignor to Libbey-Owens-Ford Glass Company, Toledo, Ohio, a corporation of Ohio Continuation of application Serial No. 117,200, September 22, 1949. This application January 2, 1951, Serial No. 204,053

8 Claims. (Cl. 49—67)

The present invention relates broadly to the bending of glass sheets or plates and more particularly to improved apparatus associated with the bending mold for positioning and retaining a glass sheet to be bent in bending relation to the shaping surface of the mold prior to and during the bending operation.

This application is a continuation of my copending application Serial No. 117,200, filed September 22, 1949, now abandoned.

The present day continuous production of bent glass sheets requires not only different and improved types of bending molds but also new and improved types of mold equipment in order to produce on a commercial scale curved glass sheets of good optical properties and having close dimensional tolerances which eliminate the need for selective fitting in installation.

This invention is concerned with the provision of special glass positioning means of improved construction associated with the bending mold and by means of which unbent glass sheets can be accurately located in bending position on the mold and retained in proper position thereon during bending and until the sheet has actually conformed to the shaping surface of the mold.

An important object of the invention is the provision of a sheet positioning means of the above character which, when associated with a glass bending mold, will permit an unbent glass sheet to be quickly and accurately mounted in bending position on the mold.

Another object is to provide, in combination with a hinged bending mold having a shaping surface and movable into open position to receive an unbent glass sheet and into closed position to receive and accurately form the bent sheet on said bending surface, of sheet locating means of the above character pivotally and adjustably mounted relative to the shaping surface of the mold.

Another object is the provision, in combination with a mold of the above character, of locating devices so mounted relative to the bending surface of the mold as to bear the thrust of an unbent glass sheet in bending position on said mold while said sheet acts as a rigid brace or strut to hold the hinged mold members in their open position.

Another object is to provide a locating device for glass bending molds upon which the bent glass sheet is to be subsequently tempered with the glass contacting member of said locating device being shaped to contact the edge of the glass while permitting free flow of tempering fluid to substantially all parts of the glass sheet.

Another object is to provide, in a sheet locating device of the above general character, a flexible glass contacting member which is adapted to engage the glass in small areas of engagement tangential to the glass edge so as to compensate for minor irregularities of said edge.

Still another object is to provide a flexible glass contacting member for this purpose which is in the form of a resilient, continuous coil of a metal that will not fuse to the glass during bending.

Still another object is to provide a locating device that is inexpensive to make, can be readily installed and that will hold up under long, continuous use.

Other objects and advantages of the invention will become more apparent during the course of the following description, when taken in connection with the accompanying drawings.

In the drawings wherein like numerals are employed to designate like parts throughout the same:

Fig. 1 is a longitudinal sectional view of one form of sheet glass bending mold, showing the locating devices of the invention associated therewith;

Fig. 2 is a fragmentary enlarged plan of a corner of the bending mold of Fig. 1, also showing the locating device as constructed in accordance with the invention;

Fig. 3 is a vertical, transverse view taken substantially along the line 3—3 of Fig. 2; and Fig. 4 is a plan view of the locating device as seen from line 4—4 of Fig. 3.

Referring now to the drawings, there has been illustrated in Figs. 1 and 2, one bending mold, generally designated by the numeral 10, with which the locating means of the invention can be advantageously employed. As shown, this mold is of hinged construction and comprises a pair of mold members 11 and 12, each of which is substantially U-shape in plan elevation and, which at the ends of the legs of the U-shapes, are provided with hinges 13 disposed below a shaping surface 14 formed on the mold members and contoured to conform, as in the full line position of Fig. 1, with the marginal area of a bent glass sheet. The mold members 11 and 12 are pivotally suspended in the corner areas of the U-shapes by means of a plurality of links 15 from the side rails 16 of a mold supporting frame 17.

This particular bending mold, which is shown by way of example of the many curved outlines to be developed in curved glass, is substantially of the shallow bend form. It therefore is adapted to produce curved glass sheets, having a large radius, in relatively lower heat atmospheres than those molds capable of producing a deeper, more complex bend. However, since glass sheets of considerable length can be handled thereon, this type of mold departs somewhat from hinged mold constructions employed in the bending of small glass lights which consequently are lighter in weight. One common element found in each of these molds is their hinged mold parts and the fact that the glass light or sheet to be bent thereon is depended upon to serve as a rigid strut while in a flat, unbent condition and until the glass softens and sags against the mold's shaping surface to conform therewith.

While not restricted to use with any particular type of mold, the special locating devices of this invention are particularly well adapted for employment with these hinged type molds. In such molds, some means of locating the glass sheet must be provided along the end sections of the mold parts so as to position the unbent glass sheet in bending relation to the shaping surface and to retain the mold parts in open position at that time. In so positioning a flat sheet of glass, one end edge is placed against the locating means on one mold part and then when the mold parts are pivoted about their associated hinges to lengthen the mold endwise, the opposite end of the glass sheet is placed in contacting relation to the oppositely disposed locating means on the other mold part. Obviously, such locating means are constantly in an eminent position for rough usage and fracture and, in addition, are called upon to absorb the endwise thrust of the glass sheet as the combined weight of the mold parts, in their open position, is borne by the unbent sheet.

According to the present invention, special locating devices 18 may be mounted on the crossweb or end section 19 of each mold member 11 and 12 for this purpose. These devices 18 are preferably disposed adjacent the sides of the mold as shown in Fig. 2 in longitudinal alignment and cooperate in pairs to position the unbent glass sheet (as indicated at 20 by phantom line in Fig. 1) in bending relation to the mold shaping surface 14. Each of the devices 18 comprises a pivotally mounted frame 21 that is supported by means of a pin 22 on a bracket 23 secured to the wall of the mold member by screws or the like 24. The pivoted frame 21 comprises a pair of side plates 25 secured together by a web portion 26 running along the bottoms and one of the sides thereof and between which is mounted a pin 27 carrying a succession of metal, glass contacting rings which, as here shown, are in the form of a helical metal coil 28. The metal, from which the coil 28 is provided, is selected from a suitable group of alloys having known heat resistant qualities within desired ranges of heat. In this particular instance and according to the intended use, a wire of an alloy known commercially as "Chromal A" has been found to be very satisfactory.

For the present purpose, it has been found that by providing such a coiled element of durable metal, several points of failure were eliminated thereby permitting longer use of the molds without recurring repairs or replacements. The metal, by reason of its inherent strength, naturally is not susceptible to breakage and accepts the endwise thrust of unbent glass sheets repeatedly without failure. In the case of substantially long glass sheets, some increase in weight is involved which correspondingly requires an additional heavier mold and these factors are apparent at the locating points when the glass sheet, acting as a rigid strut maintains the mold members in an unbalanced open position.

The helical formation of the coil 28 affords a series of spaced contact points which, by reason of their arcuate surfaces, are tangential, across small areas, to the edges of the glass sheet. These contacting areas of the helices are resiliently movable with respect to each other and consequently will shift to assimilate the contour of the edges of the glass sheet between the ends of the coil. Location of the glass sheet is therefore not dependent upon positioning of its opposite edge surfaces in one point contacting relation against a suface incapable of mutual movement throughout a common plane.

Instead, by reason of this spaced resilient relation of the coil's helices, minor irregularities of the edges can be received between the helices or in engaging contact by their individual flexure to absorb the same. The characteristic helix of the coil also includes a further desirable feature for its use in cases where the glass sheet, subsequent to the bending thereof and while still supported on the mold, is subjected to directed blasts of a cooling fluid, such as air, to temper the same and materially increase its resistance to shock or fracture. In such cases, the natural formation of the spaced contacting areas on the coil surface will adequately maintain the glass in proper position on the mold without in any way interfering with the action or complete coverage of the cooling blasts.

The pivoted frame 21 of the locating device is adjustable to the adjacent shaping surface 14 in order that the coil 28 carried thereon can initially be spaced from said shaping surface to accommodate a desirable portion of the marginal area of the unbent glass sheet in supporting relation and the sheet generally in bending relation to the surface. This adjustment is accomplished by means of a screw 29 threaded through the web 26 in the lower extremity of the frame 21 and having a lock-nut 30 located thereon. A counterbalance is also effected by the screw 29 since it tends to offset the weight of the coil 28 and to normally retain the end of the screw 29 in contact with the bracket 23.

When a flat glass sheet is placed on the mold preparatory to bending, the mold members 11 and 12 are lifted or raised at the hinge joints 13 to separate the ends sufficiently endwise to allow the glass sheet to be placed between the locating devices 18. The supporting links 15 permit the accompanying endwise motion.

As the edges of the glass sheet are placed in tangential contact with the coils 28 of the devices 18, the contour of the edges will be assimilated by the spaced relation of the coil's helices so that the endwise thrust will be evenly distributed or sustained throughout its length. Then, as the glass softens during the bending operation, it tends to sag and finally comes into contact with the shaping surface 14 as the mold members return to their closed position as shown in Fig. 1.

As the glass sheet sags and assumes its bent form on the mold, the end edges thereof will gradually separate from the locating devices 18 and by reason of the balanced condition effected between the ends of the frame 21, said devices will remain in suitable positions in which they will not interfere with removal of the same upon completion of the bending operation.

Since the type of bending mold herein described and shown, is essentially designed to produce bent glass of a relatively shallow curvature, none of the equipment is subjected to the high temperatures ordinarily reached in the development of more complex bends. The use of a flexible coil has in this instance been found very advantageous and, by reason of the novel manner of mounting, it is adapted to use its inherent qualities for purposes heretofore not contemplated. Primarily, the rigidity and strength of the metal coil provides for long continued use without susceptibility to normal fracture and breakage; then the resiliency of the helical winding affords compensating surfaces capable of absorbing minor irregularities either as to sheet length or pattern, and further each helix or spiral individually presents only a small contacting surface area tangential to the glass edge. The rigid nature of the coil also lends itself as a firm support for the glass sheet when flat and rigidly forcing the mold members to maintain their open position.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for bending glass sheets or plates, the combination with a hinged mold having a shaping surface formed on a plurality of mold sections hingedly connected together for movement into an open position to receive an unbent sheet located in bending position thereon and into a closed position in which the bending surface of the mold conforms to the curvature to which a sheet is to be bent on the mold; of sheet locating devices including glass contacting members in the form of a succession of metal rings positioned adjacent the shaping surface of the mold to engage opposite edges of an unbent sheet when in bending position on the mold.

2. In apparatus for bending glass sheets or plates, the combination with a hinged mold having a shaping surface formed on a plurality of mold sections hingedly connected together for movement into an open position to receive an unbent sheet located in bending position thereon and into a closed position in which the bending surface of the mold conforms to the curvature to which a sheet is to be bent on the mold; of sheet locating devices pivotally mounted adjacent the shaping surface of the mold for movement toward and away from said surface and including glass contacting members in the form of a succession of resilient metal rings positioned to engage opposite edges of an unbent sheet when located in bending position on the mold.

3. In apparatus for bending glass sheets or plates, the combination with a mold having a shaping surface; of a sheet locating device comprising a frame mounted adjacent said mold, and a metal coil carried by said frame in position to contact an edge of a glass sheet when in bending position on said mold.

4. In apparatus for bending glass sheets or plates, the combination with a mold having a shaping surface; of a sheet locating device comprising a frame pivotally mounted on said mold adjacent said shaping surface, and a resilient helical metal coil carried by said frame in position to contact an edge of a glass sheet when in bending position on said mold.

5. In apparatus for bending glass sheets or plates, the combination with a mold having a shaping surface; of a sheet locating device comprising a frame, means for pivotally mounting said frame on said mold adjacent said shaping surface, a pin carried by said frame, and a resilient coil of metal carried on said pin in position to contact an edge of a glass sheet when in bending position on said mold.

6. In apparatus for bending glass sheets or plates, the combination with a mold having a shaping surface; of a sheet locating device comprising a pair of spaced parallel plates pivotally mounted on said mold adjacent said shaping surface, a pin extending between said plates, a resilient helical metal coil loosely carried on said pin in position to engage an edge of a glass sheet when in bending position on said mold, and means for adjusting said plates to move said coil toward and away from said shaping surface.

7. In apparatus for bending glass sheets or plates, the combination with a mold having a shaping surface; of sheet locating devices including sheet contacting members in the form of a series of ring-like elements positioned adjacent the shaping surface of the mold to engage opposite edges of an unbent sheet when in bending position on the mold.

8. In apparatus for bending glass sheets or plates, the combination with a mold having a shaping surface; of sheet locating devices including sheet contacting members in the form of a series of resiliently mounted ring-like elements positioned adjacent the shaping surface of the mold to engage opposite edges of an unbent sheet when in bending position on the mold.

EUGENE W. BABCOCK.

REFERENCES CITED

The following references are of record in the file of this patent:

UNITED STATES PATENTS

| Number | Name | Date |
| --- | --- | --- |
| 1,999,558 | Black | Apr. 30, 1935 |
| 2,429,692 | Joyce | Oct. 28, 1947 |